Patented June 10, 1941

2,245,473

UNITED STATES PATENT OFFICE 2,245,473

SILICEOUS MATERIAL

Norbert S. Garbisch, Butler, Pa.

No Drawing. Application April 14, 1939,
Serial No. 267,910

2 Claims. (Cl. 106—52)

The present invention relates to preparation of intimate and very finely-divided mixtures of silica and glass suitable for use in glass batch, in pottery bodies and many other industrial applications.

One object of the invention comprises the provision of a process of grinding plate glass with sand whereby the finely-divided wastes from the grinding operation are obtained in substantially iron free form without magnetic or chemical treatment.

In the grinding and polishing of the surface of plate glass it is customary to cement the plates to tables or cars which are conducted under revolving blocks or disks termed runners. There a slurry of sand in water is sluiced out upon the glass and under the pressure of the runners the sand gradually abrades or cuts away the surface to a uniform plane. The sand is, also, gradually broken down into minute fragments and, at the same time, it becomes admixed with finely-divided glass from the plates and iron from the runners. From time to time the mixture is subjected to a classification operation in order to remove the finer particles. The coarser material is fed back for making the initial or coarser cuts. The finer materials are advanced for use in the later stages of grinding. Ultimately, the sand is broken down to such fine state that it is no longer practicable to employ it in the grinding operation. At this stage, the sand usually comprises about 20 per cent of glass debris, about 1.5 per cent of iron from the runner bars, a little plaster from the grinding tables and perhaps traces of oil and other impurities. The remainder usually comprises silica, together with such impurities as were originally present in the grinding sand. All of these are suspended in water and are so finely divided that they will pass a screen of about 325 mesh. Heretofore, this finely-divided mixture has been discarded as being of no value. In some cases, it has been run into streams and there it constitutes a source of contamination. By settling out, it also tends to clog up the channels of the streams. In other cases the sand has been partially dewatered and piled in dumps. Here the finely-divided material when exposed to the wind tends to scatter as dust and is highly objectionable. In order to reduce this dust hazard sprinkling systems have been installed over the dumps in order periodically to apply water thereto.

It is well recognized that there is a large market, for example, in the pottery industry, for finely-divided silica. In this industry it is admixed with feldspar as a flux and is then incorporated with the pottery body in order to provide a non-shrinking skeleton in the latter. This material is usually supplied by grinding pure flint or quartz to as fine a state of subdivision as possible. This obviously is a very expensive operation.

It has been suggested that the silicates in the waste sands from the grinding and polishing of glass might be employed as substitutes for the silica and feldspar in a pottery body. Simultaneously, the glass content would provide a flux replacing all or a part of the feldspar usually employed in such bodies. However, the conventional wastes contain such high percentages of iron, such as iron from the grinding sands and also iron incorporated from the runner bars of the grinding apparatus, as to be wholly unsuitable for addition to a pottery body of quality.

A further use which has been suggested for the waste sands has comprised addition to a glass batch as substitutes for sand and cullet. The intimate mixture, of course, would afford important advantages because of the intimate association of the glass and silica. When such intimate mixture is heated, the glass can readily attack the silica and tends to promote rapid fusion into a uniform molten vitreous body. However, again it has been found that the iron in a conventional waste grinding sand precludes the use of the latter in a glass batch.

In accordance with the provisions of the present invention difficulties with iron in a waste grinding sand are eliminated by employing a grinding sand for plate glass which is initially free of iron and then conducting the grinding operations with a non-ferrous runner bar or disk.

In the practice of the invention glass of a common type such as is employed in the production of window glass or plate glass is drawn or cast to provide plates of suitable dimensions, which plates after formation are suitably annealed in order to relieve internal stresses or strains therein. These plates are secured to polishing cars or tables by means of plaster of Paris, or other means and are then passed under a series of runner disks or bars. Apparatus for conducting the grinding operation may be of conventional design and does not constitute an element of the present invention. The abrasive agent is sand and preferably should be of a high state of purity, e. g. a batch-type sand containing not more than 0.1 or 0.2 per cent of iron and being of approximately 99 per cent purity, or of even higher purity. If sand such as is conventionally employed in grinding glass and containing considerable amounts of impurities, notably of iron, is employed, the waste sand finally obtained will be so contaminated that it cannot be used in a glass batch, at least for quality wear.

The sand is suspended in water in accordance with the usual practice to provide a slurry which is thrown upon the surface of the glass and is distributed over the latter as the runner bars revolve in contact therewith. The solids content of the slurry will be within a range of about 7 to 40 per cent. As the grinding operations progress the sand is subjected to classification from time to time, in order to remove the finer particles. These, if not too fine, are advanced to subsequent stages of the grinding operation for making the finer cuts. The coarser material is recycled. The extremely finely-divided material too fine for abrasive purposes is removed as a slurry containing about 15 per cent of solids. It is dewatered by settling centrifugating or filtration or preferably by combination of these processes. The product without further treatment is adequately free of iron.

The runner bars or blocks employed in practicing the invention are formed of a suitable non-ferrous material, the debris of which is not objectionable in a glass batch or in a pottery body. For example, they may be formed of glass, which during the course of the grinding operation is gradually worn down and the debris therefrom provides additional glass or finely-divided cullet for the batch. Where a glass runner bar is employed the wastes from the grinding operation probably will contain from about 20 to 40 per cent of glass, the rest of the mixture being essentially finely-divided silica, together with small amounts of plaster and possibly other products resulting from the grinding operations. A glass runner bar preferably should initially be of substantial thickness, for example, 3 or 4 inches thick and the surface thereof may be scored or checked in order to assist in distributing the grinding sand over the surface of the glass undergoing polishing operations.

If preferred, the runner bars may be formed of other non-ferrous substances, the debris of which is not objectionable for the specific purpose for which the waste sand is intended. Properly faced and scored blocks of limestone or marble of adequate purity constitutes an example of such material. They are softer than the glass undergoing polishing operations and accordingly they wear down fairly rapidly, but since lime is conventionally employed as a flux in a glass batch it is beneficial rather than objectionable, if the sand is recycled in a glass batch. It is, of course, obtained in an extremely fine state of subdivision and is uniformly and thoroughly distributed throughout the mixture of sand and silica. This is of advantage where the material is added to a glass batch because it fluxes to form glass at a somewhat lower temperature than that required for formation of glass from conventional coarse materials.

Grinding blocks or runner bars may also be formed of flint or quartz, which by reason of their great hardness are comparatively resistant to wear or abrasion by the sand. The debris from such blocks of course merely increases the percentage of silica in the batch and is in no wise objectionable where the wastes are to be employed as glass batch or as a source of silica and glass for use as a substitute for ground flint and feldspar in a pottery body.

Granite constitutes another natural stone, blocks of which, when properly faced and scored, may be employed as runners for grinding glass. The granite contains falspathic substances which are permissible in a pottery body. Where the surface of the glass is polished with sand under a granite runner bar the resultant mixture of finely-divided silica glass and granite is excellently adapted for use in place of ground flint and feldspar.

Runners may, also, be formed of porcelain or porcelain-like materials. The blanks for the runners are molded or cast from a conventional body comprising about 40 or 50 per cent of clay and the remainder being primarily silica and fluxes. Waste grinding sand from the present process may be employed to supply these ingredients. The body is fired at a suitable temperature and subsequently it is annealed and then faced by grinding. The finished blocks may be attached to the spindles of the grinding machines by bolts, holes for which are molded in the body.

Runners may, also, be formed by pressing pure waste sand at a temperature of about 1650° F. The operation may be performed in molds of proper shape. The pressures employed are of the order of 2000 to 6000 pounds per square inch or more. Under the foregoing conditions the glass particles sinter without actual melting and under the strong pressure the sintered particles become bonded to the particles of silica, to provide a dense body of great mechanical strength. The body may be annealed and cooled and if warpage occurs it may be faced by grinding.

Runner bars of organic material such as hard wood, or Bakelite are also permissible. These bars tend to wear down during the grinding operation, but the debris is relatively combustible and when the material is incorporated into molten glass and subsequently fired the organic material is substantially completely consumed.

The slurry or suspension of waste sand from the grinding tables or cars, without preliminary purification, may be partially dewatered by settling or decantation. It may then be subjected to filtering. In the latter type of apparatus the water content can be reduced to about 17-25 per cent of the mass. If the material is to be employed in a glass batch it is desirable to incorporate into the wet cake or mud as thus obtained requisite amounts of fluxes, such as soda-ash and/or borax. Lime may also be required. These fluxes are admixed with the wet slurry by suitable apparatus and subsequently the mixture is subjected to mulling in an edge runner type mill, which operation if the water is then in the ratio above described, results in the formation of nodules or balls of a size suitable for addition to a glass batch. The mulled material may be partially or completely dried, which operation results in the hardening of the fluxes to provide an adequate bond between the finely-divided material.

The nodules or balls may be added to a glass batch in a pot or tank in the same manner as conventional glass batch. By reason of the bonding action of the fluxes contained therein no difficulty from dusting is encountered. Likewise, segregation of the various constituents of the batch is obviated. The balls are readily wetted by the molten glass in the pot or tank (assuming a continuous process is employed and quickly become thoroughly heated). As a result melting is rapid and complete. Since the silica fluxes and glass are extremely uniformly distributed the material is found to fuse down into a glass at a somewhat lower temperature than is conventionally required.

If the material is to be employed as a substitute for flint and feldspar in a pottery body it may be preliminarily dried for shipment or if preferred it may be maintained in the moist or wet state and then mixed with clay, in order to provide a suitable body. In a pottery body it may be employed in a ratio of 40–20 per cent or even more or less, based upon the solid content of the body. The remaining constituents of course are clay and other conventional substances of a pottery mass. Pottery bodies containing the material have good working qualities and when formed into suitable shape and fired are found to be of high translucency, which is usually a desirable characteristic of quality wares.

Use of waste sand as a source of silica and fluxes is described in my copending application Serial No. 184,598, filed January 12, 1938, now U. S. Patent 2,215,215.

The embodiments of the invention herein disclosed are to be regarded merely as exemplary. Numerous modifications may be made therein without departure from the spirit of the invention or the scope of the following claims.

What I claim is:

1. A process of making glass which comprises smoothing the surfaces of glass plates by grinding them with a slurry of sand of glass batch purity under runners composed of material, debris from which is non-deleterious to a glass batch, until the sand is broken too fine for further grinding operations, and comprises silica and about 20 to 40% of glass abraded from the glass plates, then removing excess water from the sand, incorporating glass fluxes and melting the mixture to form additional glass.

2. A process of making glass, which comprises smoothing the surfaces of glass plates by grinding them with a slurry of sand substantially free of iron under runners composed of material, debris from which is non-deleterious to a glass batch, until the sand is broken so fine as to be useless for further grinding operations and comprises silica and about 20 to 40% of glass abraded from the glass plates, then removing excess water from the sand, incorporating the fluxes of the glass batch with the sand and forming the resultant mixture into nodules and subsequently melting the nodules down to form additional glass.

NORBERT S. GARBISCH.